US007471639B1

(12) United States Patent
Bauer et al.

(10) Patent No.: US 7,471,639 B1
(45) Date of Patent: Dec. 30, 2008

(54) METHOD AND SYSTEM FOR MODULATING MEDIA PACKETS

(76) Inventors: Michael Bauer, 88 King St., Apt. 712, San Francisco, CA (US) 94107; Swaminatha V. Vasudevan, 5473 Moonlight Common, Fremont, CA (US) 94555; Biren Sood, 47 Ellenwood Ave., Los Gatos, CA (US) 95030; Ran M. Oz, 27 Nahal Gaaton Street, Modiin, 71700 (IL)

( * ) Notice: Subject to any disclaimer, the term of this patent is extended or adjusted under 35 U.S.C. 154(b) by 697 days.

(21) Appl. No.: 10/421,257

(22) Filed: Apr. 22, 2003

Related U.S. Application Data

(60) Provisional application No. 60/442,584, filed on Jan. 23, 2003.

(51) Int. Cl.
*H04J 9/00* (2006.01)
*H04H 20/30* (2008.01)

(52) U.S. Cl. .................... 370/252; 370/486; 348/384.1; 375/240.01; 725/97; 725/105

(58) Field of Classification Search ................. 370/252, 370/390, 432, 477, 480, 486; 348/384.1, 348/385.1, 388.1, 355.1; 375/240.01; 725/91, 725/95, 97, 105, 144
See application file for complete search history.

(56) References Cited

U.S. PATENT DOCUMENTS

| | | | | |
|---|---|---|---|---|
| 5,408,259 | A * | 4/1995 | Warwick | 725/149 |
| 5,541,757 | A * | 7/1996 | Fuse et al. | 398/72 |
| 5,546,379 | A * | 8/1996 | Thaweethai et al. | 370/254 |
| 5,565,908 | A * | 10/1996 | Ahmad | 725/93 |
| 5,881,245 | A * | 3/1999 | Thompson | 709/219 |
| 6,041,056 | A * | 3/2000 | Bigham et al. | 370/395.64 |
| 6,378,130 | B1 * | 4/2002 | Adams | 725/95 |
| 6,483,870 | B1 * | 11/2002 | Locklear et al. | 375/222 |
| 6,546,017 | B1 * | 4/2003 | Khaunte | 370/412 |
| 6,718,552 | B1 * | 4/2004 | Goode | 725/95 |
| 6,842,785 | B1 * | 1/2005 | Norcott et al. | 709/229 |
| 7,023,882 | B2 * | 4/2006 | Woodward et al. | 370/487 |
| 7,159,235 | B2 * | 1/2007 | Son et al. | 725/91 |
| 7,246,366 | B1 * | 7/2007 | Addington et al. | 725/93 |
| 2002/0007491 | A1 * | 1/2002 | Schiller et al. | 725/87 |
| 2002/0126685 | A1 * | 9/2002 | Leatherbury et al. | 370/432 |
| 2002/0162114 | A1 * | 10/2002 | Bisher et al. | 725/91 |
| 2002/0184649 | A1 * | 12/2002 | Wilson | 725/114 |
| 2003/0002577 | A1 * | 1/2003 | Pinder | 375/240.01 |

* cited by examiner

*Primary Examiner*—Chi H. Pham
*Assistant Examiner*—Ahmed Elallam
(74) *Attorney, Agent, or Firm*—Reches Patents

(57) ABSTRACT

A system and method for modulating a service conveying stream to be transmitted over a medium, the method includes: (i) receiving a service conveying packet belonging to the service conveying stream; and (ii) determining at least one modulation parameter for the modulation of the service conveying packet in response to at least one network topology characteristic and in response to at least one client related parameter. The system includes input ports and a management entity capable of determining modulation parameters.

35 Claims, 6 Drawing Sheets

502

522

542

METHOD AND SYSTEM FOR MODULATING MEDIA PACKETS

RELATED APPLICATIONS

This application claims the benefit of U.S. provisional application 60/442,584, entitled "Dynamic Routing of Digital Video Feeds to Broadcast and Narrowcast QAMs Based on Geographical and Time-Of-Day Popularity Distribution Patterns in a Cable TV System", filed 23 Jan. 2003.

FIELD OF THE INVENTION

The present invention relates to modulation of media packets and especially for managing multiple modulators.

BACKGROUND OF THE INVENTION

Information signals, such as data signals, media signals and especially compressed video and audio streams and more especially packetized audio and media streams propagate over various communication channels, such as but not limited to terrestrial, wireless, satellite, wireline and cable communication channels. Media streams usually include large amounts of information.

Digital transmission and compression techniques allow for transmitting media signals over communication channels in a compressed form. The Moving Pictures Experts Group (MPEG) specifications are standardized methods for compressing and transmitting media signals such as video and audio.

Communication channels that are connected to clients have a limited bandwidth, said limitation is known in the art as the "last mile problem". Accordingly, only a certain amount of services can be provided to clients over said limited bandwidth channels. The amount of services is especially limited when some of them are bandwidth consuming.

It is noted that certain bandwidth limited networks are known in the art as broadband networks, but the term "broadband networks" mostly emphasizes the much larger bandwidth these communication networks have (usually about 750 Mhz) in comparison to even more bandwidth limited communication networks and technologies, such as Plain Old Telephone Networks, dial-in modems and the like.

Clients are grouped in service groups. A service group includes a plurality of clients, such as set top boxes, cable modems and the like, that receive the same multiplexed downstream signal ('downstream' means from service provides to a client, while 'upstream' means information transmitted from the clients) as they share the same communication link/output port of a node, hub or even a Headend. A service group is also known in the art as a "forward carrier path".

Typically, media packets are provided to Headends, primary hubs, secondary hubs and nodes and then are transmitted over communication networks to the clients. Some media packets can pass through more than one entity out of said Headend, hubs and nodes. In order to transmit the media packets over said networks they are modulated in various manners known in the art.

The modulation is implemented by modulators that may be located within said entities. The cost of modulators, especially modulators that are used to broadcast packets to a very large amount of clients, is high. Furthermore, many modulators can be involved in modulating the same media packets to multiple clients, thus reducing the overall amount of services that is provided to clients.

A typical modulator is a Quadrature Amplitude Modulation (QAM) modulator, although other modulators, such as QPSK modulators, are known in the art. QPSK modulation is more robust than QAM modulation but is slower. It is noted that QPSK modulation may be used for modulating upstream information.

A QAM modulator usually receives input signals and outputs a modulated signal over a Radio Frequency carrier. Usually said modulator is also able to perform additional processing steps such as encryption, error correction coding, interleaving and the like. Most QAM modulators are able to alter the carrier frequency within a predefined frequency range. The modulators are arranged in arrays that are also known in the art as multi-modulators. Multi-modulators provide multiple modulated output signals. Modulated signals that are spaced apart in the frequency domain can be combined. Typically, each modulator outputs an output channel that has a bandwidth of 6 Mhz. The 6 Mhz channel can be used to convey a single analog television channel or ten MPEG compliant television channels. Typically, downstream channels are in the 50-750 Mhz band while upstream channels are in the 5-40 Mhz band.

U.S. patent application number US 2002/0162114 of Bisher JR et al. describes a system and method for multicasting packets in a subscriber network. The method is able to determine whether a media packet is a unicast packet or a multicast packet. In response to the determination the media packet is sent to a unicast buffer and a unicast modulator or is sent to multicast buffers and multicast modulators.

SUMMARY OF THE PRESENT INVENTION

The invention provides a system for modulating service conveying packets. The system includes multiple modulators, capable of modulating service conveying packets; and a management entity, connected to the multiple modulators, for determining at least one modulation parameter for the modulation of the service conveying packet in response to at least one network topology characteristic and in response to at least one client related parameter.

The invention provides a system for managing multiple modulators that includes: multiple input ports, for receiving media streams; and a management entity, connected to the multiple modulators, for selecting a modulator of the multiple modulators to modulate a media packet that belongs to a media stream, in response to at least one client related parameter, said client being connected to the modulator.

The invention provides a system for managing multiple modulators, the system includes multiple input ports, for receiving a service conveying packet belonging to a service conveying stream; and a management entity, connected to the multiple modulators, for determining at least one modulation parameter for the modulation of the service conveying packet in response to at least one network topology characteristic and in response to at least one client related parameter.

The invention provides a method for managing multiple modulators for modulating service conveying packets, and especially a method for reducing the amount of multicast packets while providing multiple services to multiple clients. The multiple modulators are connected to multiple clients via communication networks and may be positioned in various locations such as within Headends, primary hums, secondary hums, nodes and the like. The management scheme takes into account the topology of the network and especially the mapping between clients and modulators. Said mapping describes the (at least one) service group that is connected to each modulator.

According to an aspect of the invention the modulators may differ from each other by various characteristics, including the power of the modulated signals they output. Some of the modulators, especially those whose signals are eventually provided to a larger amount of clients and/or are more attenuated prior to arriving to the clients, are required to output relatively high power modulated signals, and may be more costly then modulators that are aimed to provide their modulated signals to fewer clients.

Generally speaking, the modulators may be arranged in a multiple level/multiple tier configuration. This configuration may include broadcast modulators as well as narrowcast modulators. Broadcast modulators feed substantially every client that is connected to the communication network and include narrowcast modulators. The narrowcast modulators may differ from each other as some are connected only to few clients (for example, are connected only to a single node within a hub), some may be connected to one or more hubs, some may be connected to a single hub and some may be connected to few nodes within a hub, said hubs may be primary or secondary hubs.

According to an aspect of the invention the client receives services over a limited bandwidth channel. The allocation of bandwidth between broadcast modulators and narrowcast modulators and even between the various types of narrowcast modulators may be fixed or may vary. In a fixed scenario a modulator does not change its carrier frequency, while the service that is provided by the modulator may vary. In another scenario, the carrier frequency may change.

According to an aspect of the invention the carrier frequency of a certain modulated service conveying packet stream may change while at least one client receives it. In such a case the client is notified in a timely manner about the expected alteration, and is allowed to change its configuration (usually change its tuner frequency) to allow it a continuous reception of that service in spite of said alteration.

According to an aspect of the invention the allocation of service among modulators is responsive to an amount of alteration, and may be designed such as to reduce the amount of such alterations. The amount of alterations may be predicted in response to various parameters such as previous viewing patterns, and the like.

According to an aspect of the invention the clients are arranged in groups of service. Members of a service group receive the same (multiplexed) signal. Accordingly, the viewing patterns of service groups, as well as requests of clients per service group are provided to and/or calculated by the management system.

According to an aspect of the invention the method may alter a modulation of a media packet by providing the media packet to one modulator instead of another modulator. Said alteration may involve routing media packets to modulators that are characterized by predefined modulation parameters.

According to an aspect of the invention the clients are connected to a management system that controls a switch (or router) that is connected between multiple modulators and service providers. The management system may reside in the switch. Multiple switches may be located within various entities of a multi-tier distribution system. Usually, a switch of a certain tier may receive service-conveying streams from higher tier entities (including higher tier switch) and from its own tier service providers.

The switch may include a mapping between modulators, their frequencies and the clients that they serve and accordingly may route service conveying packets to modulators according to this mapping and additional parameters.

According to one aspect of the invention the system includes a BMR that is able to provide multiple multiplexed signals via multiple output ports, and is able to configure multi-modulators and RF circuitry in accordance to said management scheme.

According to another aspect of the invention each array of multi-modulators is connected to add and drop circuitry. Said multi-modulator may also be connected to media processors, various management entities and the like.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following are definitions, which are used throughout the description of the disclosed technique:

DVB/ASI and DHEI are examples for digital video (MPEG) transmission specifications. The disclosed technique provides examples, which include DVB/ASI modules. It is noted that equivalent modules, such as DHEI modules, and the like, can replace these DVB/ASI modules.

DOCSIS is a data over cable transmission specification. CMTS denotes cable modem termination system, which is conventionally used for DOCSIS. MPEG denotes a family of media (especially video and audio) decoding and multiplexing specifications where ISO/IEC 11172 is also called MPEG-1 and the ISO/IEC 13818 is also called MPEG-2.

Service conveying packet include a plurality of information signals, such as a sequence of information signals and the like, that are either (a) associated with a service, (b) can be processed, either alone by themselves or in association with other service conveying packets, to provide at least a portion of a service to an end user, (c) media signals, (d) status signals, (e) control signals, (f) any combination of the mentioned above options, and the like. For example, service conveying packets may convey a plurality of services such as digital television channels, analog television channel, video on demand, internet television, audio on demand, radio channel, telephony, data, internet and the like. The service can require downstream transmission of service conveying packets but can also include upstream transmission of service conveying packets.

The following examples and figures focus on media packets and MPEG compliant media streams. It is noted that the invention may be applied to other compression schemes and may be applied mutatis mutandis to service conveying packet other than media packets.

The management system may define a modulation parameter of a certain media packet in response to a "cost" of modulating the media stream by a certain modulator. The "cost" is further discussed in more details in relation to FIG. 5.

Figure 1:
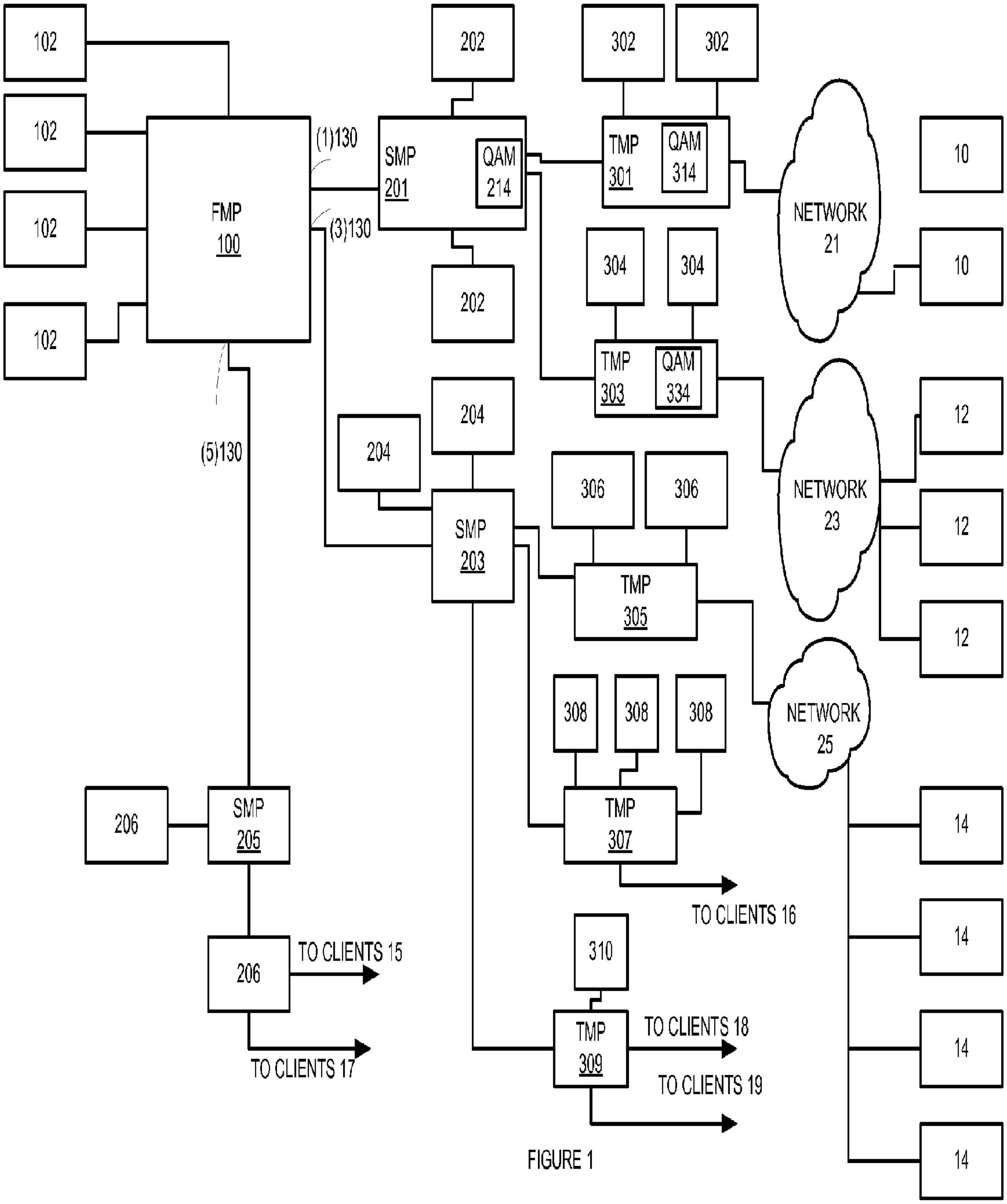
FIG. 1 illustrates a triple tier distribution system, in accordance to an embodiment of the invention.

FIG. 1 illustrates a triple tier distribution system 10 that includes: first tier media sources 102, second tier media sources 202, 204 and 206, third tier media sources 302, 304, 306, 308 and 310; first tier multiple media stream manager and provider (FMP) 100; second tier multiple media stream managers and providers (SMPs) 201, 203 and 205; third tier multiple media stream managers and providers (TMPs) 301, 303, 305, 307 and 309; and networks 21, 23 and 25.

FMP 100 is connected to media providers 102 and SMPs 201, 203 and 205. FMP 100 may also be connected to clients and TMPs. SMP 201 is connected to output port 130(1) of FMP 100, media sources 202 and TMPs 301 and 303. SMP 203 is connected to output port 130(3) of FMP 100, media sources 204 and TMPs 305, 307 and 309. SMP 205 is connected to output port 130(5) of FMP 100, media sources 206 and clients 15 and 17. TMP 303 is connected to media sources 304, SMP 201 and network 23. TMP 305 is connected to media sources 306, SMP 203 and network 23. TMP 307 is connected to media sources 308, SMP 203 and network 25. TMP 309 is connected to media source 310, SMP 203 and clients 18 and 19. Network 21 interconnects TMP 301 to clients 10. Network 23 interconnects TMP 303 to clients 12. Network 25 interconnects TMP 305 to clients 14.

It is noted that the amount of clients that are connected to each network, as well as the amount of clients per service group well exceeds the amount of clients that is illustrated at FIG. 1. It is further noted that distribution systems may have more than three tiers, or less, as well as different entities per tier.

The first, second and third tier entities are connected to each other via networks (not shown) that are usually characterized by a bandwidth that well exceeds the bandwidth of the multiplexed signal that is eventually provided to clients. These networks may be configured in various manners, such as a mesh, star and ring configuration and can also support various communication protocols, such as Asynchronous Transfer Mode, Frame Relay, Ethernet, Gigabit Ethernet, SONET, WDM, packet switched WDM and the like. Those of skill in the art will appreciate that the distribution system may include redundant communication links and entities for increasing the robustness of the distribution system.

Each QAM modulator within system 20 may be characterized by the clients that are capable of receiving its modulated output signal. For example, clients 10 may receive a modulated signal from modulators within TMP 301, SMP 201 and FMP 100, and especially from QAM modulators of FMP 100 that are connected to output port 130(1) of FMP 100 and from QAM modulators within SMP 201 that are connected to output port 230(1) of TMP 201. As illustrated in further details below, SMP 201 may replace some of the modulated signals from output port 130(1) by its own modulated signals (said signals being provided from media sources 202), or may receive from output port 130(1) a multiplex signal that has a more limited bandwidth than 50-750 Mhz.

SMPs 201, 203 and 205 and TMPs 301, 303, 305, 307 and 309 can replace modulated signals from FMP 100 (in the case of SMPs and TMPs) or even from SMPs (in the case of TMPs) by their own modulated signals. For example, SMP 201 can modulate media signals from media providers 202 and replace some modulated signals from FMP 100, especially modulated signals that are not to be provided to the clients that are connected to SMP 201. The replacement is based upon a knowledge of the carrier frequency of the modulated signals to be replaced and can be implemented by a radio frequency add/drop circuitry. It is noted that the add/drop circuitry may include variable or fixed filters as well as combiners. It is further noted that at least the drop operation may be implemented in the optical domain.

Figure 2:
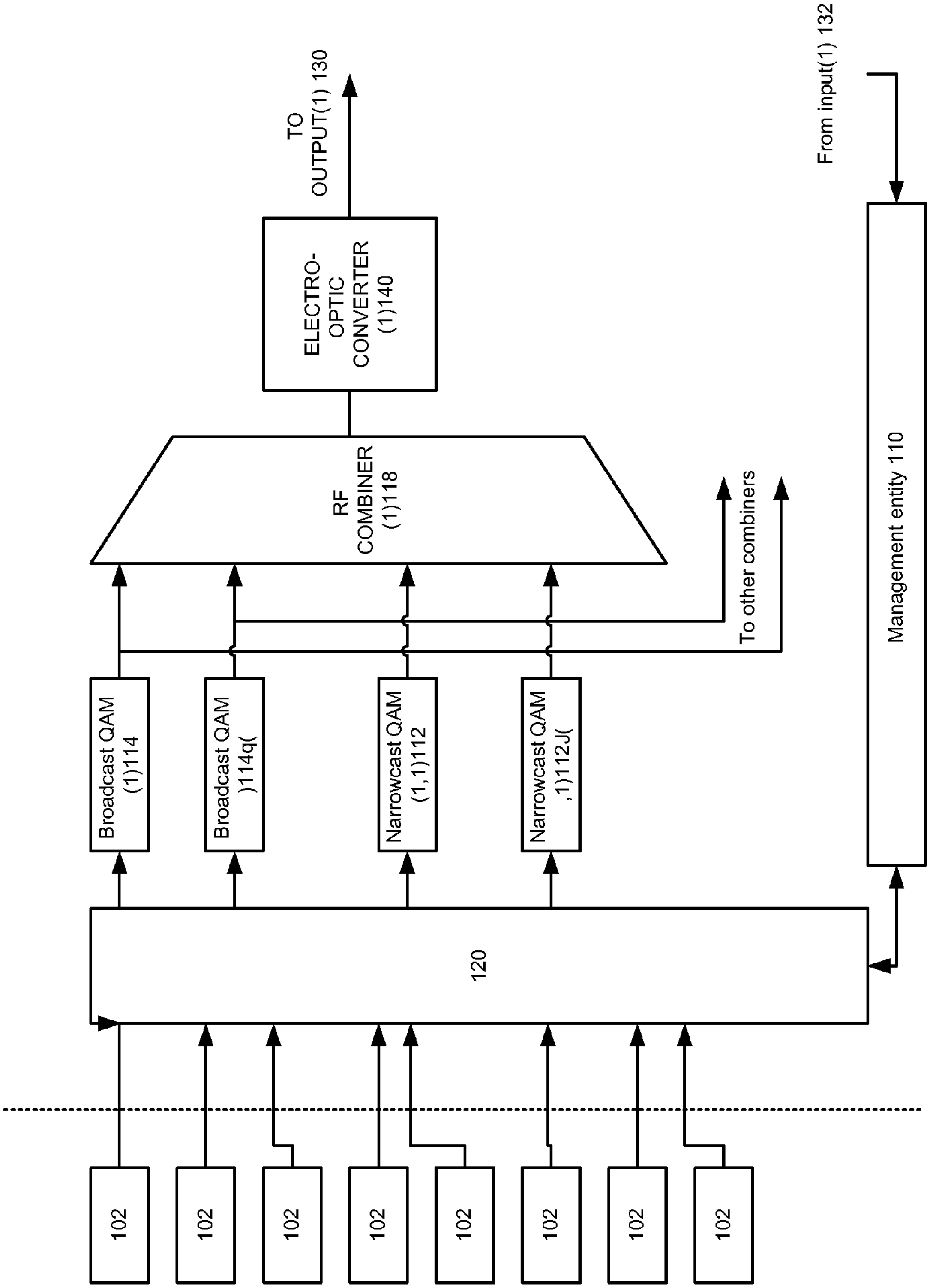
FIG. 2 illustrates a first tier multiple video stream manager and provider, in accordance to an embodiment of the invention.

As illustrated by FIG. 2, FMP 100 has multiple (j) output ports, such as output ports 130(1), 130(3) and 130(5) and further includes a management entity 110, router/switch 120, and multiple QAM modulators 114(1) 114($q$), and 112(1,1) 112(K,J). Management entity 110 controls router/switch 120 that in turn is connected between multiple media sources 102 and QAM modulators 112 and 114. QAM modulators 114(1)-114($q$) are broadcast QAM modulators while others are narrowcast QAM modulators.

A modulated media stream can be provided to multiple outputs of FMP 100 by either duplicating the media stream prior to the modulation and then feeding it to multiple QAM modulators, by splitting a modulated signal (either in the RF domain or in the optical domain, if an RF to optic conversion is implemented within FMP 100) or by a combination of both. For example, a broadcast QAM modulator may include multiple QAM modulators that receive the same feed or a QAM modulator that is connected to an RF splitter that is able to split the modulated signal outputted from the QAM modulator. As illustrated in FIG. 2, the RF modulated signals are converted to optical signals by electro-optic converters 140, before exiting FMP 100. It is noted that said conversion is optional and is usually not implemented by TMPs 301-309.

For convenience of explanation FIG. 2 illustrates in greater details only one group of QAM modulators (112(1)) that are connected to output port 130(1) of FMP 100 via electro-optic converters 140(1). FIG. 2 also illustrates router/switch 120 that is able to route media packets towards QAM modulators 112(1).

It is noted that router/switch 120 can also route media packets to QAM modulators that are not illustrated in FIG. 2, and that FMP 100 may include additional switch/routers that are not illustrated in FIG. 2.

Input port 132(1) of FMP 100 receives upstream information. The upstream information may be transmitted to communication links and networks that resemble the downstream path but usually have a much smaller bandwidth, but this is not necessarily so. The upstream information includes requests of clients to receive downstream media streams or may include a representation or an analysis of client requests, said representation or analysis being generated by second or third tier entities. For example, assuming that clients 14 request to view a certain television program. The entity of these clients are usually irrelevant to FMP 100, that is more interested in the overall requests generated by members of the service group that includes clients 14.

FMP 100 may respond to the upstream information by routing a media stream to a certain modulator or even by dropping a media stream. The response reflects (i) a mapping between QAM modulators 112 and the clients that are connected to FMP 100, and (ii) the requests from various groups of service to receive said media stream. Said routing is preceded by a step (executed by management entity) of determining which media streams are provided to which QAM modulator and by a configuration of switch/router 120 to support said determination.

Networks 21-25 are able to convey to clients output signals within a predefined frequency range. Today, this spectrum ranges between 0-870 Mhz. The 0-50 Mhz range is allocated for upstream traffic, while the remaining 50-870 Mhz range is allocated for downstream traffic. Usually, FMP 100, SMP 201-205 and TMP 301-309 are able to exchange signals having a larger (and even much larger) spectrum.

It is assumed that the carrier frequencies of each QAM are fixed. The output signals of FMP 100 can be provided to SMP 200 and/or to TMP 300 and/or directly to some of the clients.

According to a first embodiment of the invention most QAM modulators are located within the FMP 100 (said configuration may be referred to as a centralized configuration), but this is not necessarily so and the amount of QAM modulators within any SMP and any TMP 300 and especially the ratio between the amount of QAM modulators within FMP, SMPs and TMPs may vary, usually in response to the amount of media streams provided by media providers such as 102, 202, 204, 206, 302, 304, 306, 308 and 310. According to said first embodiment the amount of QAM modulators within an SMP and within an TMP is much smaller than the amount of modulators within FMP 100. It is noted that according to other embodiments of the invention the amount of QAM modulators within FMP 100 may be even smaller or even much smaller than the amount of QAM modulators that are located within SMPs and/or TMPs.

According to an embodiment of the invention, each service group receives a distinct service group signal. Each service group signal may include a plurality of analog television channels and a plurality of digital television channels, as well other media packets and other service conveying packets.

Assuming that a member of a service group requests to receive a media stream that is not currently provided to his service group, the management entity shall have to decide whether to add the requested media stream to the media streams that are provided to that service group. An addition of a media stream requires modulating the requested media stream by a QAM modulator that is accessible to the service group. The selection may be responsive to various parameters such as the entity of other service groups that receive the requested media stream and to the mapping between them and the service groups. If the selected media stream is already provided to a service group the provision of the media stream may involve changing the carrier frequency of the media stream, while notifying the currently receiving clients to alter their tuner configuration.

FMP 100 has many modulators, while SMPs and especially TMPs have much fewer modulators. The modulators are usually used for modulating local media streams from local media providers such as 202, 204, 302-310, and the like. SMPs and TMP may manage their resources and determine whether a local media stream is to be provided although said determination may be made by the management entity within FMP 100.

Figure 3A:
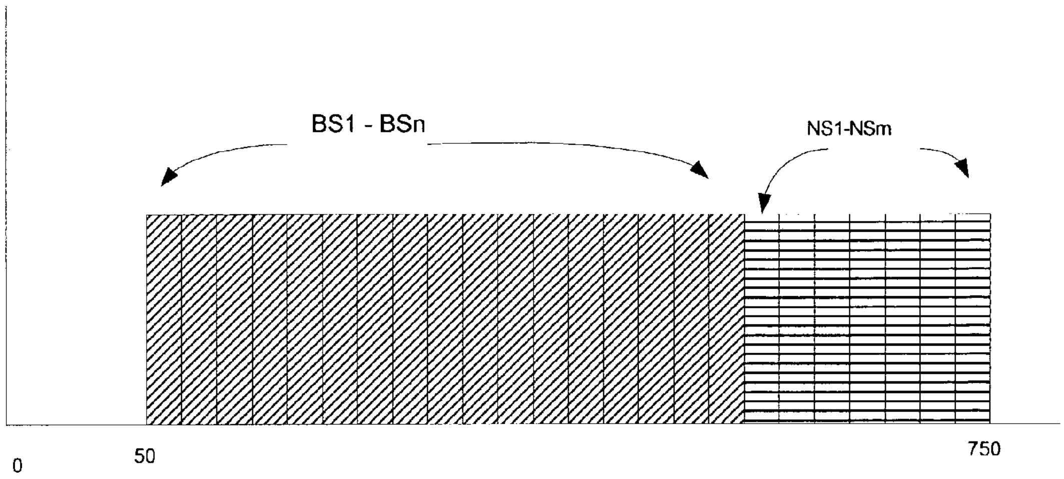
FIGS. 3*a*-3*c* illustrates various multiplexed signals provided by FMP, SMP and TMP of FIG. 1.
Figure 3B:
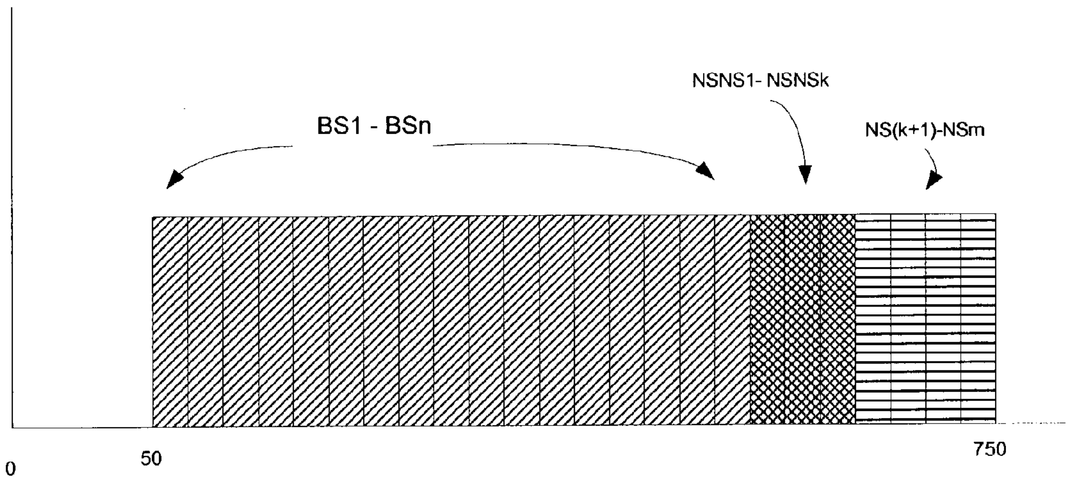
Figure 3C:
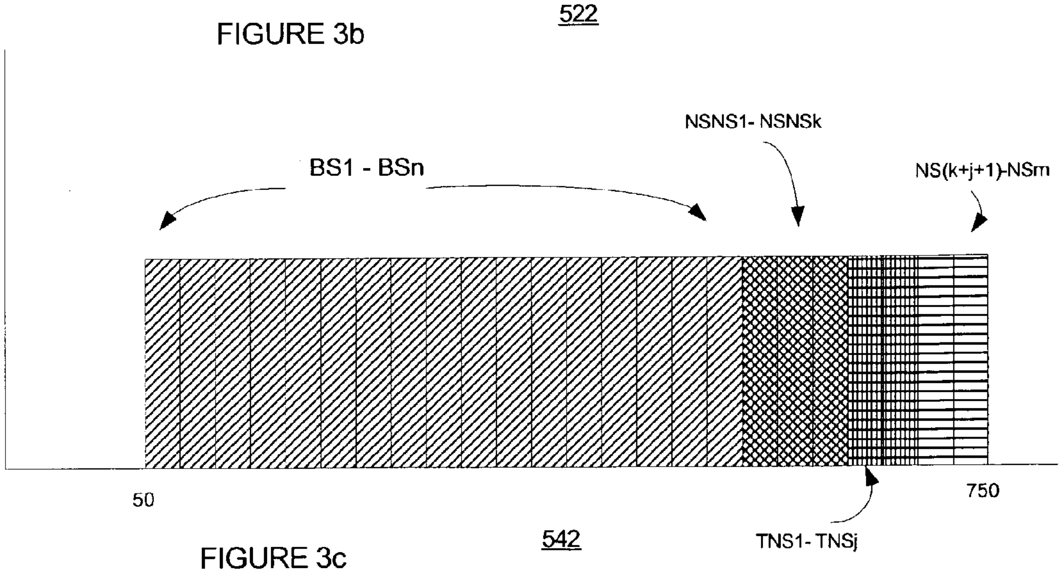

Reference is now made to FIGS. 3*a*-3*c* that illustrates various multiplexed signals. FIG. 3*a* illustrates a portion 502 of a signal that is outputted from output 130(1) of FMP 100. This portion ranges between 50 and 870 Mhz. As noted before, the multiplexed signal from each output port of FMP 1000 that is directed to either an SMP or TMP may well exceed 870 Mhz, while the signal that is sent over networks 21, 23 and 25 is limited to said frequency range. Signal 502 includes multiple broadcast signals BS1-BSn, as well as narrowcast signals NS1-NSm. Typically, the narrowcast signals may be removed by SMPs and TMP by local media streams, while broadcast signals are not replaced, though this is not necessarily so.

FIG. 3*b* illustrates a portion 522 of a signal that is outputted from SMP 201. This portion resembles portion 502 but several narrowcast signals out of NS1-NSm were replaced by narrowcast signals SNS1-SNSk provided from media sources 202.

FIG. 3*c* illustrates a portion 542 of a signal that is outputted from TMP 201. This portion resembles portion 522 but several narrowcast signals out of NS1-NSm were replaced by narrowcast signals TNS1-TNSj provided from media sources 302.

Figure 4:
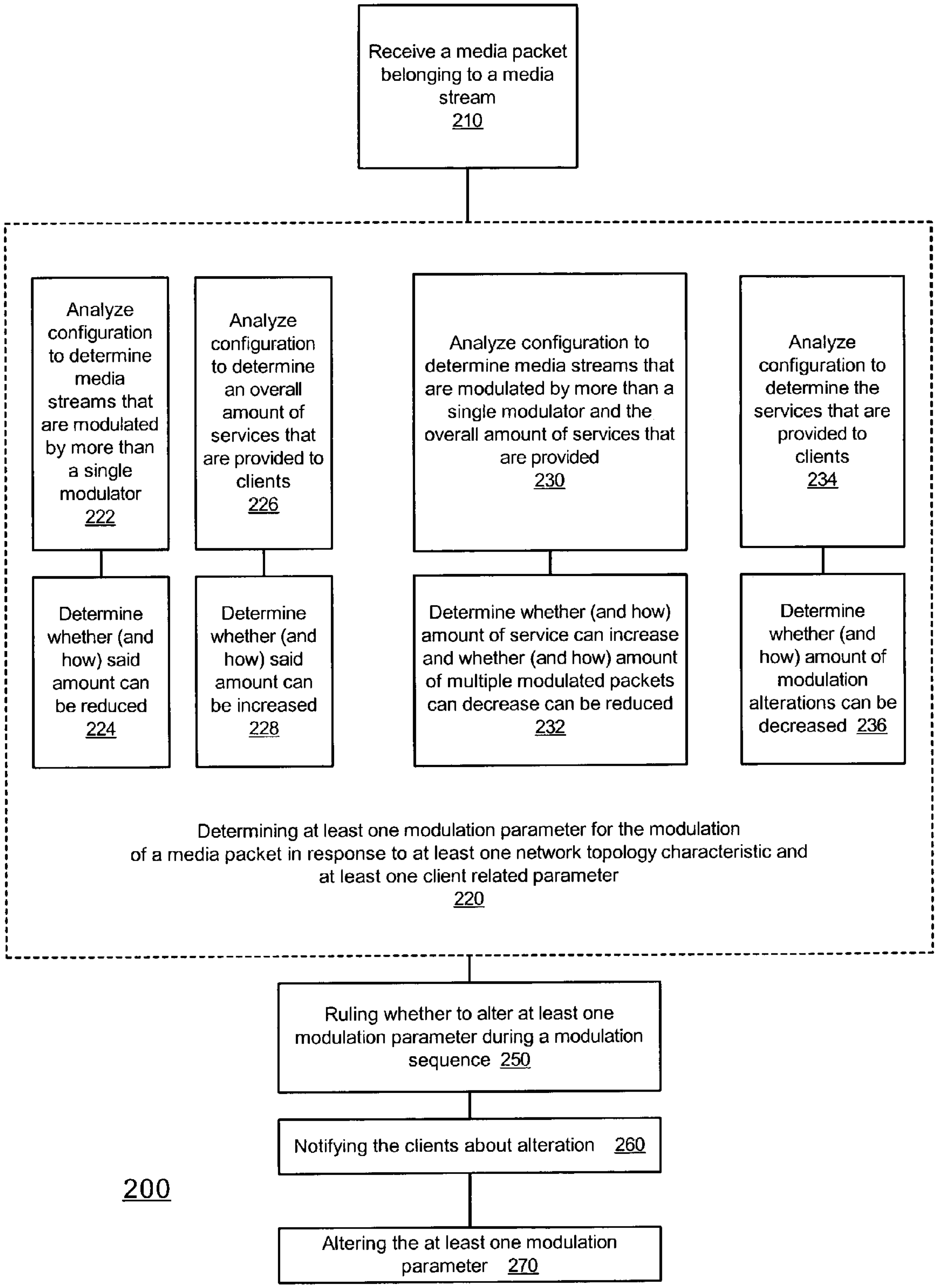
FIGS. 4-5 are flow charts illustrating methods for modulating a media packet, in accordance to an aspect of the invention.

Method 200 for modulating a media packet, in accordance to an aspect of the invention is illustrated by FIG. 4. Method 200 starts by step 210 of receiving a media packet belonging to the media stream. Step 210 is followed by step 220 of determining at least one modulation parameter for the modulation of the media packet in response to at least one network topology characteristic and in response to at least one client related parameter. Conveniently, at least one modulation parameter is the identity of the modulator that shall modulate the media packet and/or the frequency of the modulated signal. The modulator is selected in response to the client or clients that shall receive the media stream that includes the media packet. In a fixed configuration the identity of the modulator also defines the modulation frequency. Step 220 may include each of the following step pairs: 222 and 224; 226 and 228; 230 and 232; 234 and 236. The at least one client related parameter can reflect at least the following: the amount of service that can be provided to the client (or to other clients), the priority of the requested service, the priority of the client, the client's quality of service, client viewing patterns, estimated alterations that are required for providing the media stream to the client (whereas said estimation can be responsive to the client viewing patterns). Conveniently, the client related parameter relates to a service group as a whole, and not to each client within the service group.

According to an aspect of the invention the determination is aimed to minimize multiple modulations of a single media stream. This aim may be achieved by step 222 of analyzing a current configuration of the network (especially the mapping between modulators and clients) to define which media streams are modulated by more than a single QAM modulator and step 224 of checking whether an amount of modulators that modulate the same media stream can be reduced, usually by modulating that media stream by another (such as but not limited to higher tier modulator). Step 224 usually includes checking each media stream that is modulated by multiple modulators and the "cost" of changing the QAM modulator that modulate that media stream.

According to another aspect of the invention the determination is aimed to maximize an amount of overall services provided to clients. This aim may be achieved by step 226 of analyzing a current configuration of the network (especially the mapping between modulators and clients) to define the media streams that are provided to clients and step 228 of checking whether the overall amount of service can be increased by changing the modulation parameters.

It is noted that the determination may also be responsive to a combination of said parameters, as illustrated by step 230 of analyzing and step 232 of providing an optimal determination in view of both the amount of service to be provided to clients and the amount of modulators that are used to modulate the same media stream. The optimization may include providing a weight factor to each of said considerations.

As illustrated by the various steps the determination is usually responsive to a current (or previous) state of modulation. The previous modulation state may be less relevant when the system is initialized or when a media stream was not previously provided to clients. The current state of modulation is usually more significant once media streams are already provided to clients and especially when the provision of a media stream may reduce the overall service provided to clients.

According to a further aspect of the invention the determination is responsive to an amount of modulation alterations that occur during the transmission of a media stream. This aim may be achieved by step 234 of analyzing a current configuration of the network (especially the mapping between modulators and clients) to define the media streams that are provided to clients, step 236 of checking whether at least one modulation parameter of at least one media stream that is currently provided has to change and determine the total amount of changes that must take place in order to allow the provision of the media stream.

Step 220 is followed by step 250 of ruling whether to alter at least one modulation parameter during a modulation sequence of media stream that includes the media packet. Usually, if the carrier frequency of a currently provided media stream is changed the clients that currently receive the media stream must change the configuration of their tuner. In order to allow a seamless alteration of carrier frequency step 250 is followed by step 260 of notifying the clients about said change and step 270 of implementing the change. In order to guarantee a seamless alteration (or at least increase the probability of such an alteration) various measures may be implemented. One of them being waiting a predefined period after the notification takes place, before altering the parameters, in order to allow the notification to be transmitted, received processed and acted upon. Another measure can be using an acknowledgement and/or verification mechanism.

The amount of alterations, as well as the entity of clients (or more usually service groups) that shall perform the alteration may be taken into account when determining how to modulate a media stream, and especially when selecting which modulator shall modulate the media stream.

According to an aspect of the invention the method aims to reduce the amount of alterations (either generally or in relation to a certain service group or in relation to certain services and/or in response to a combination thereof). The alterations may be reduced by estimating future requests to receive services from clients.

According to further aspects of the invention the steps mentioned above are further responsive to priority levels of service groups as well as priorities of media streams. The priority may define whether a certain requested media stream is to be dropped, in order to allow another media stream to be provided, which modulation sequence may be altered and the like.

Figure 5:
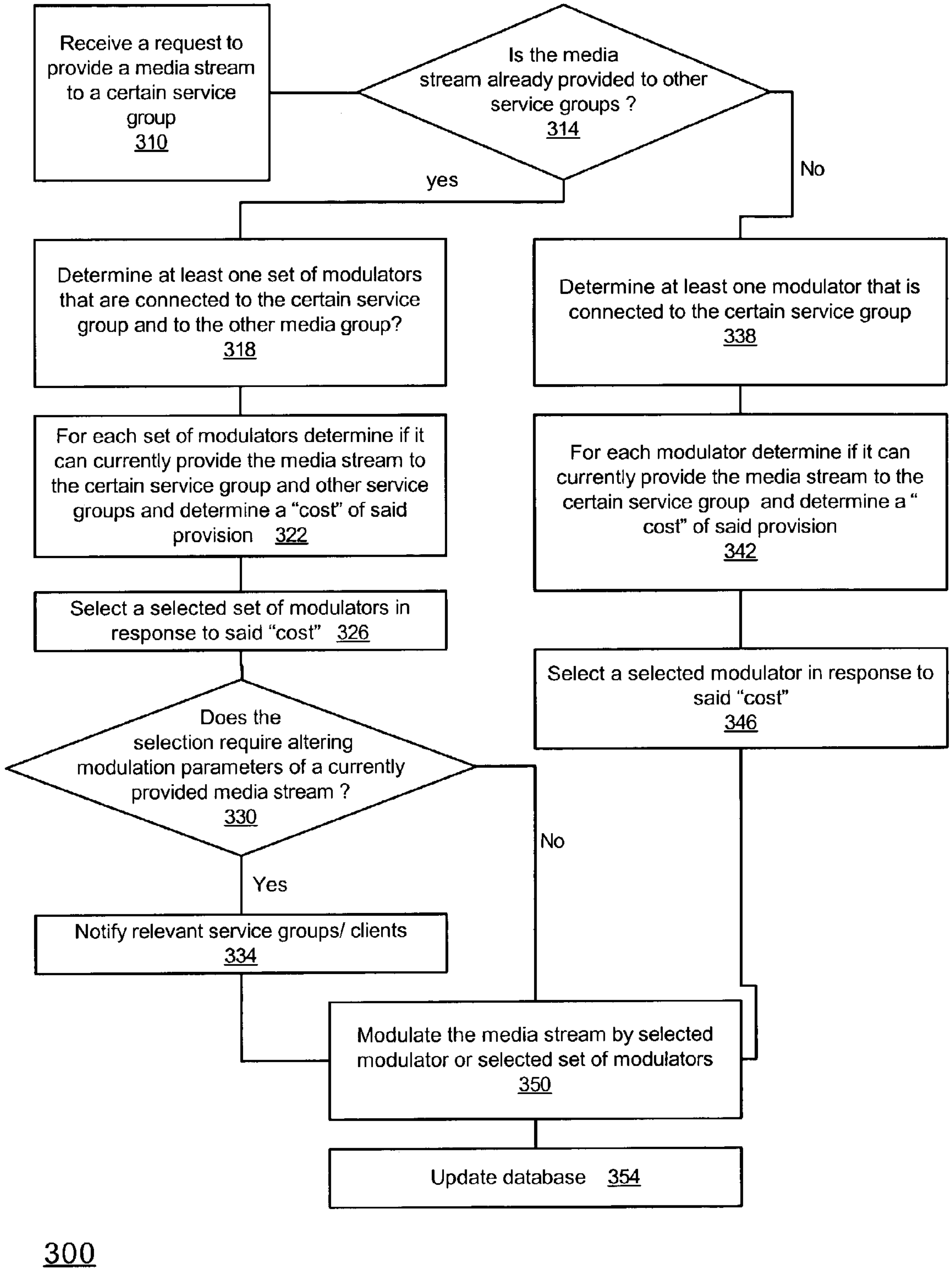

Referring to FIG. 5 illustrating method 300 for modulating a media packet. Method 300 starts by step 310 of receiving a request to provide a certain media stream to a certain service group. The request is upstream transmitted from a client to the management entity.

Step 310 is followed by step 314 of determining whether the media stream is already provided to other (at least one) service group. Usually such a request is not forwarded to the management system, for purposes of altering modulation parameters, if the requesting client belongs to a service groups that currently receives said media stream. It is noted that such requests may be provided to the management entity for various purposes, such as (but not limited to) for updating viewing patterns, updating the "cost" of altering modulation alterations.

If the answer is "yes" (the media stream is currently provided to other service groups) step 314 is followed by steps 318-334, else—step 314 is followed by steps 338-346. Both steps 346 and 334 are followed by steps 350 and 354 of modulating the media stream by a selected modulator and updating a data base, for various purposes such as for updating viewing patterns, cost of modulator selection and the like.

Step 318 includes determining at least one set of modulators that is connected to the certain service group and to the other service groups. The set may include a single modulator, but this is not necessarily so. The set may include either a single modulator or at least one narrowcast modulator. The set may include modulators form various tiers, but this is not necessarily so.

For example, referring to FIG. 1, it is assumed that broadcast QAM modulator 114(1) of FMP 100 is connected to all service groups, SMP's 201 QAM modulator 214 is connected to clients 10 and 12, and TMP's 301 QAM modulator 314 is connected to clients 10 and TMP's 303 QAM modulator 334 is connected to clients 12. If client 10 requests a media stream that is currently provided to client 10 then a first modulator set may include modulator 114(1), a second set may include QAM modulator 214, and a third set may include QAM modulator 314 and QAM modulator 334.

Step 318 is followed by step 322 of determining, for each set of modulators the "cost" of providing the media stream. Referring back to the previous example, the "cost" of providing the media stream by each of the sets is calculated.

Step 322 is followed by step 326 of selecting a set of modulators in response to the "cost" of the provision of the certain media stream to the other service group and to the certain service group.

Step 326 is followed by step 330 of determining whether the selection requires altering a modulation parameter of a modulation sequence. If so—step 330 is followed by step 334 of notifying the relevant service groups/clients and step 350. If no alterations are required step 334 is followed by step 350.

Step 338 includes determining at least one certain modulator (to modulate the media stream) that is connected to the certain service group. This certain modulator may be broadcast modulator, a narrowcast modulator, and it can belong to various tiers.

Step 338 is followed by step 342 of determining, for each certain modulator the "cost" of providing the media stream.

Step 342 is followed by step 346 of selecting a selected modulator in response to the "cost" of the provision of the certain media stream to the certain service group.

The mentioned above methods select modulators in response to a "cost" function. Various methods for optimizing a configuration based upon "cost" functions are known in the art. According to an aspect of the invention the "cost" of modulating a certain media stream is calculated by associating a weight factor to various parameters. The parameters may be: (i) the amount of clients that shall alter their configuration as a result of a change in the modulating parameter of another media stream; (ii) the amount of expected alterations; (iii) the amount of services that may be dropped (or be accessed by fewer clients) in order to allow the provision of the selected media stream. It is further noted that the "cost" function, and accordingly, the weight factor, can be further responsive to the priority of the media stream and/or the priority of the clients. According to various aspects of the invention the cost function may reflect the amount of multiple modulations of a single media stream, the amount of multiple modulation in at least one tier; the amount of overall services provided to clients; the amount of alterations occurring during a modulation sequence of at least a portion of the media stream; or a combination of at least one of said factors.

According to an embodiment of the invention the distribution system may include a Broadband Media Router, such as one of the BMR family of BigBand Networks Inc., but this is not necessarily so. Some aspects of the Broadband Multimedia Router are illustrated at U.S. Pat. No. 6,434,141 of Oz et el, that is incorporated herein by reference.

The BMR is able to receive and process multiple media streams and provide multiple media streams (either processed or not) to a QAM modulator array that is connected to (either directly or via an optional configurable RF switch modulator) to an RF combiner array. The QAM modulator array is able to provide multiple modulated signals of distinct frequencies to each RF combiner. The QAM modulator array (and optionally the configurable RF switch) is controlled by a dynamic network restructuring unit. The dynamic network reconstruction unit can be a part of the management system or can be controlled by the management system.

According to one aspect of the invention before a media stream is modulated and sent to a combiner the system verifies that the media stream has distinct characteristics (such as a distinct PID) than other media streams that are provided to the same combiner, and may change a characteristic of the media stream in order to avoid collisions. This may involve PID remapping.

Figure 6:
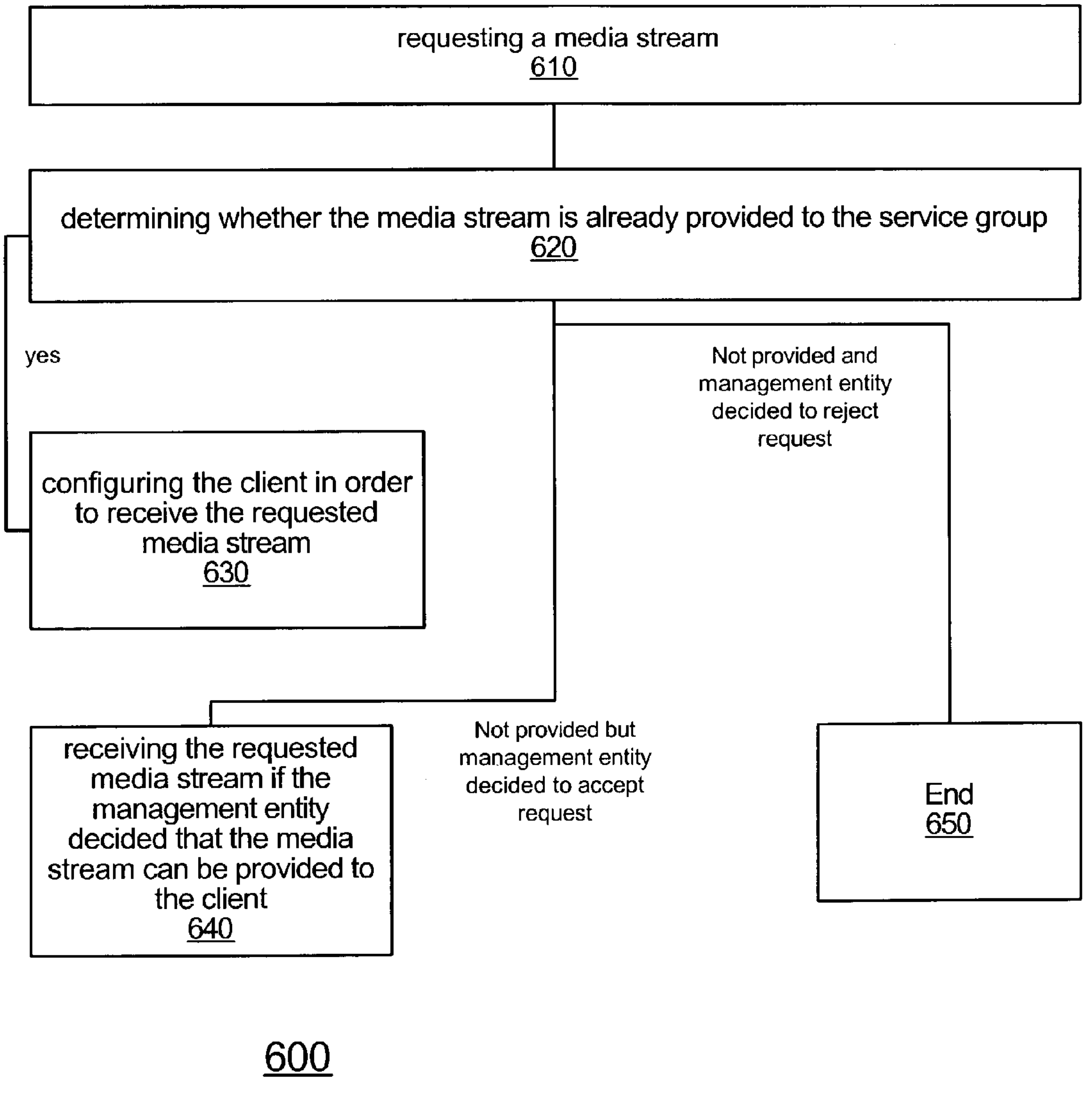
FIG. 6 is a flow chart illustrating a method for receiving services, in accordance to an aspect of the invention.

Referring to FIG. 6 that is a flow chart illustrating method 600 for receiving services, in accordance to an aspect of the invention. Method 600 is usually implemented by a client, and especially by software that is installed on a set top box and is executed by a processor within the set-top box.

Method 600 starts by step 610 of requesting a media stream, said request can be initiated by an end-user by a remote control, a predefined request and the like.

Step 610 is followed by step 620 of determining whether the media stream is already provided to the service group. If so, step 620 is followed by step 630 of configuring the client (usually tunes a tuner and defines a relevant media stream characteristic) in order to receive the requested media stream. It is noted that in some cases there is no need to tune the tuner (for example if the newly requested media stream is already received by the tuner but later rejected (for example on a PID basis) by the client processor. If the media stream is not provided to the service group then the client transmits a request upstream to receive the media stream. The management entity eventually receives such request and processes it in accordance to one of the previously described methods. In a distributed configuration wherein several management entities exist, the request usually is first transmitted to the lowest level management entity that manages media streams that are provided to that client. Step 620 may include processing information related to transmitted media streams (for example MPEG compliant media streams include tables that describe the programs that are included in the media stream) to determine whether the multiplexed signal that is provided to the service group includes the requested media stream.

If the media stream is not provided to the service group step 620 is followed by step 640 or by step 650. Step 640 follows step 620 if the management entity decides that the media stream can be provided to the client, it includes receiving of the requested media stream. Step 640 may include altering the configuration of the client. Such an alteration will be preceded by a step of receiving a notification about said alteration. Step 650 ends the method by rejecting the request.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for modulating a service conveying stream to be transmitted over a network, the method comprising the steps of:

receiving a service conveying packet belonging to the service conveying stream; and determining at least one modulation parameter for the modulation of the service conveying packet in response to at least one network topology characteristic and in response to at least one client related parameter; wherein the network comprises modulators arranged in multiple tiers and wherein the determining comprising checking whether an amount of modulators that modulate a single service conveying stream can be reduced by modulating the single service conveying stream by a higher tier modulator.

2. The method of claim 1 wherein determining at least one modulation parameter such as to minimize multiple modulations of a single media stream.

3. The method of claim 1 wherein determining at least one modulation parameter in order to maximize an amount of overall services provided to clients.

4. The method of claim 1 wherein determining at least one modulation parameter in response to an amount of services to be provided to clients and to a utilization of modulators used to modulate the service conveying packet.

5. The method of claim 1 further comprising modulating the service conveying packet in response to the determination.

6. The method of claim 1 wherein the step of determining is responsive to at least one previously applied modulation parameter.

7. A method for modulating a service conveying stream to be transmitted over a medium, the method comprising the steps of:

receiving a service conveying packet belonging to the service conveying stream; and determining at least one modulation parameter for the modulation of the service conveying packet in response to at least one network topology characteristic and in response to at least one client related parameter; wherein a service conveying packet belongs to a media stream that is modulated by multiple modulators during a modulation sequence and wherein the method further comprises a step of ruling whether to alter at least one modulation parameter during the modulation sequence.

8. The method of claim 7 further comprising altering at least one modulation parameter in response to said ruling.

9. The method of claim 7 further comprising notifying the client of the alteration and guaranteeing a seamless alteration.

10. The method of claim 7 wherein said ruling is responsive to an amount of alterations occurring during a modulation sequence of at least a portion of the media stream.

11. The method of claim 7 wherein the at least one network topology characteristic comprises a mapping between modulators to groups of service that are coupled to said modulators and wherein the at least one client related parameter is a priority of a service group.

12. The method of claim 11 wherein the determining of at least one modulation parameter is response to an amount of groups of service that request to receive the service conveying stream.

13. The method of claim 11 wherein determining at least one modulation parameter in response to an amount of clients that request to receive the media stream and in response to a priority of these clients.

14. A system for managing multiple modulators, the system comprising:

multiple input ports, for receiving a service conveying packet belonging to a service conveying stream; and a management entity, coupled to the multiple modulators, for minimizing multiple modulations of a single media stream by determining at least one modulation parameter for the modulation of the service conveying packet in response to at least one network topology characteristic and in response to at least one client related parameter.

15. The system of claim 14 wherein the multiple modulators are arranged in multiple tiers and wherein the management entity is adapted to determine that at least one modulation parameter by checking whether an amount of modulators that modulate a single service conveying stream can be reduced by modulating the single service conveying stream by a higher tier modulator.

16. The system of claim 14 wherein the determination comprises selecting at least one modulator to modulate the service conveying packet.

17. The system of claim 14 wherein the determination is responsive to an amount of multiple modulations of a single media stream.

18. The system of claim 14 wherein the determination is responsive to an amount of overall services provided to clients.

19. The system of claim 14 wherein determination is responsive to an amount of services to be provided to clients and to a utilization of modulators used to modulate the service conveying packet.

20. The system of claim 14 wherein a modulator out of the multiple modulator modulates the service conveying packet in response to the determination.

21. The system of claim 14 wherein the determination is responsive to at least one previously applied modulation parameter.

22. The system of claim 14 wherein the at least one network topology characteristic comprises a mapping between modulators to groups of service that are coupled to said modulators.

23. The system of claim 22 wherein the management entity is configured to determine at least one modulation parameter is response to an amount of groups of service that request to receive the service conveying stream.

24. The system of claim 23 wherein the management entity determines at least one modulation parameter in response to an amount of clients that request to receive the media stream.

25. The system of claim 14 further comprising a multi-port switch, coupled to the management entity and to the multiple modulators, for routing media streams to modulators, in response to the determination.

26. A system for managing multiple modulators, the system comprising:

multiple input ports, for receiving a service conveying packet belonging to a service conveying stream; and a management entity, coupled to the multiple modulators, for determining at least one modulation parameter for the modulation of the service conveying packet in response to at least one network topology characteristic and in response to at least one client related parameter; wherein a service conveying packet belongs to a media stream that is modulated by multiple modulators during a modulation sequence and wherein the management entity rules whether to alter at least one modulation parameter during the modulation sequence.

27. The system of claim 26 wherein at least one modulator alters at least one modulation parameter in response to said ruling.

28. The system of claim 11 wherein the system notifies the client of the alteration.

29. The system of claim 26 wherein said ruling is responsive to an amount of alterations occurring during a modulation sequence of at least a portion of the media stream.

30. A system for managing multiple modulators, the system comprising:

multiple input ports, for receiving media streams; and a management entity, coupled to the multiple modulators, for selecting a modulator of the multiple modulators to modulate a media packet that belongs to a media stream, in response to at least one client related parameter, said client being coupled to the modulator;

wherein the at least one client related parameter is an estimated alterations that are required for providing a media stream to a client.

31. The system of claim 30 wherein the system monitors client requests to receive media streams.

32. The system of claim 31 wherein the management entity updates at least one client related parameter in response to said monitoring.

33. The system of claim 30 wherein the system generates client viewing patterns in response to said update.

34. The system of claim 30 wherein the modulators are QAM modulators.

35. The system of claim 30 wherein the modulators are RF modulators.

* * * * *